Figure 1:
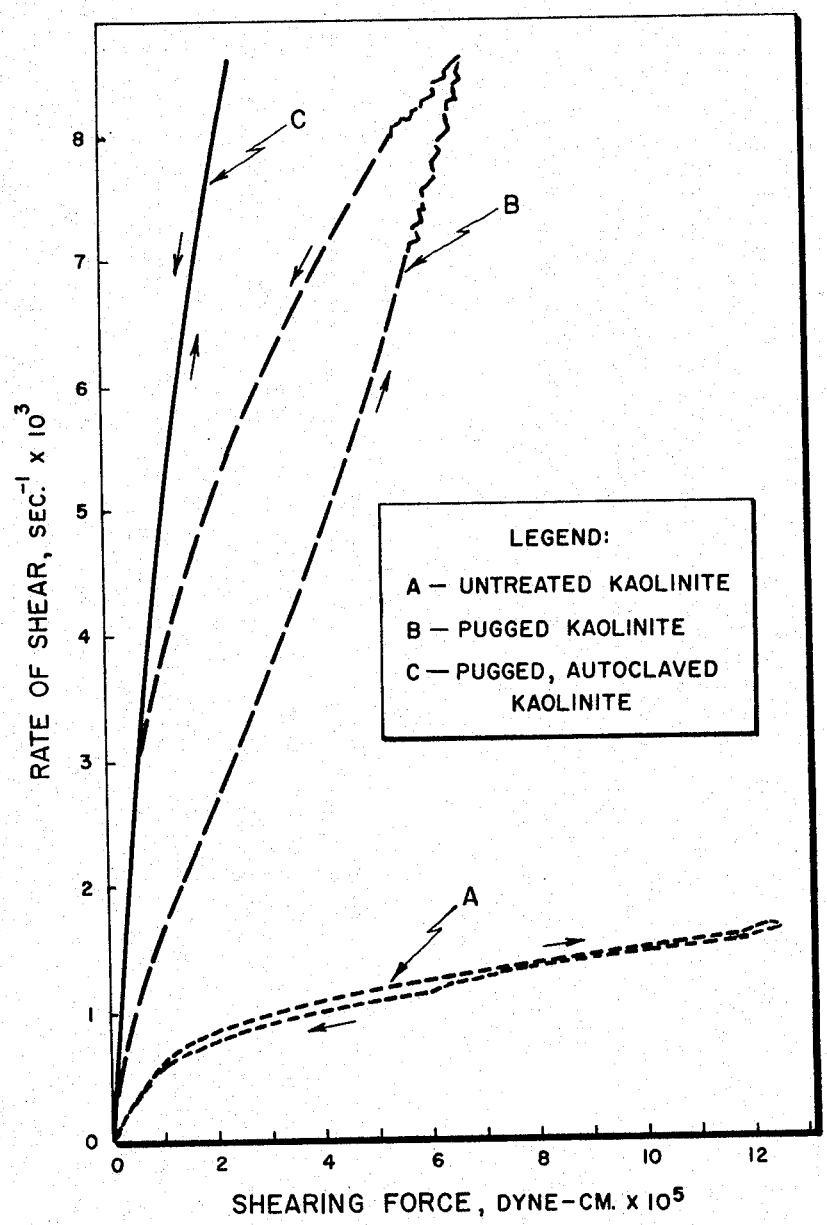

United States Patent Office 3,301,691
Patented Jan. 31, 1967

3,301,691
PAPER COATING CLAY AND METHOD FOR TREATING THE SAME
Glen A. Hemstock, East Brunswick, and Robert J. Bergmann, Irvington, N.J., assignors to Minerals & Chemicals Philipp Corporation, Menlo Park, N.J., a corporation of Maryland
Filed Dec. 27, 1963, Ser. No. 337,971
20 Claims. (Cl. 106—72)

This invention has to do with kaolin clay that is intended for use as a paper coating pigment and relates specifically to a treatment of kaolin clay to alter and improve the rheological properties of aqueous slips of the clay. This application is a continuation-in-part of Serial No. 187,349, filed April 13, 1962, now abandoned.

Following is a simplified diagrammatic flow sheet of a typical plant practicing a preferred form of the invention.

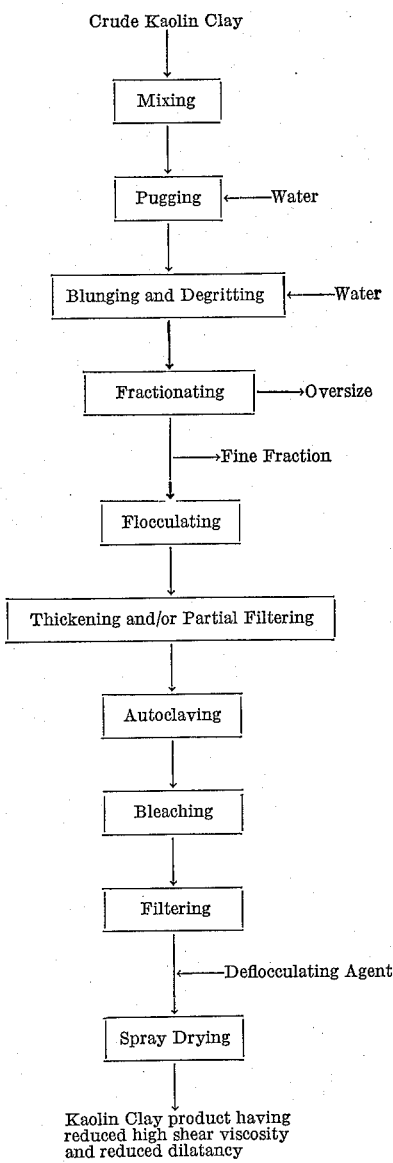

This invention has for its principal object the reduction of viscosity of deflocculated high clay solids aqueous clay slips when the slips are subjected to high rates of shear such as are presently employed by the paper coating industry. This invention also has for an object the reduction in dilatancy of concentrated clay slips at high shear rates. A further object of this invention is the provision of a novel kaolin clay product which when incorporated at high concentrations into water or into aqueous adhesive systems results in high clay solids compositions whose rheological properties at high shear rates represent a marked improvement over the rheological properties of compositions containing the untreated clay. Further objects and advantages of this invention will be readily apparent.

One of the most important uses of kaolin clay, especially a minus 2 micron size fraction of the clay, is as the sole or principal pigment ingredient in a coating color which is applied to paper to produce a desirable white surface finish thereon. The coating color is a composition consisting essentially of water, adhesive, pigment and pigment dispersant (deflocculant). In former years the speeds at which paper coating machines applied coating colors to raw stock were rather low and coating colors of fairly low solids content, say 50% to 60%, sufficed. While the flow properties of minus 2 micron cuts of kaolin clays vary from mine to mine, as well as from various locations within a mine, there are extensive deposits of kaolin clays from which there can be obtained a minus 2 micron material whose aqueous slips possess the desired rheological properties for former paper coating operations. At present, however, the paper coating industry employs very high machine speeds and, in order to maintain adequate drying rates, considerably more concentrated coating colors are required. Thus, for example, many present day paper coating operations employ coating colors having a total solids content within the range of about 60% to 65%. Using casein or latex adhesives, the kaolin has a major influence on the fluidity or lack of fluidity of the high solids coating color and a kaolin must be selected which will not result in a coating color having excessive viscosity. In making up all high solids coating colors, irrespective of the adhesive employed, the viscosity of high solids kaolin slips is of primary concern to the industry. The clay must originally by made up into a highly concentrated deflocculated slip (typically at 70% to 72% clay solids) which is subsequently diluted with adhesive suspension. To minimize storage costs, the clay solids content of the slip should be as high as is practical. The concentrated clay slip must be capable of being transferred in the plant by pumps and must not require excessive power when agitated. At clay solids concentrations of about 70% and above, many deflocculated kaolin slips exhibit unique rheological properties at the high shear rates employed in pumps and mixers in the coating plant that are not exhibited by the slips at low shear rates or by less concentrated clay slips at high shear rates. Thus, high solids slips of a substantial percentage of the minus 2 micron content of the kaolins available for mining vary from being either slightly too viscous to being considerably too viscous when subjected to high shear rates employed in the pumps and mixers employed in present day paper coating operations. Moreover, an appreciable percentage of the kaolin in reserve deposits exhibits an undesirable degree of dilatancy when concentrated slips of the clay are sheared at high rates. Dilatancy is a phenomenon that manifests itself in an increase in apparent viscosity with increasing shear rate and slips possessing this characteristic are difficult, or impossible, to pump and handle in the coating plant. Therefore, many available kaolin clays which possess the desired whiteness and can be fractionated to obtain a cut having a particle size distribution suitable for paper coating purposes are totally unfit for use in the production of present day coating colors.

To measure the flow properties of clay slips at high shear rates approximating those now encountered in the handling of present day coating colors, the Hagan and Hercules Hi-Shear instruments are used by the industry. Values obtained by low shear viscometric methods, such as by the Brookfield and Stormer instruments, are virtually without meaning in ascertaining the rheological properties of the slips at high shear rates. Accordingly, all viscosities referred to hereinafter refer to high shear viscosities, namely, viscosities of systems at shear rates of about 1500 to about 9000 sec. —1, as determined by the Hagan Viscometer, described hereinafter.

A typical present day viscosity specification for a "normal viscosity" paper coating grade kaolin is that a 71% solids clay slip has a maximum apparent viscosity of about 17 poises at a shear rate of 1530 sec. —1. Such clay, however, will frequently not meet the more stringer requirement of other present day coaters who require that a 70.5% clay solids slip has an apparent viscosity not to exceed about 1.7 poises at a shear rate of 4820 sec. —1. The latter specification is that of a "low viscosity" kaolin and it is difficult to meet. English kaolins, which are primary clays, fail to meet the specification for a "normal viscosity" coating clay and their viscosities are appreciably above those of "low viscosity" kaolins. The reserves of domestic kaolins which can meet the specification for a low viscosity kaolin have dwindled at an alarming rate and is of great concern to clay producers and the paper coating industry.

The problem of converting high viscosity clays to low viscosity clays or of further reducing the viscosity of slips of low or normal viscosity clays is complicated by the fact that there is as yet no validated explanation as to the reason for variations in high shear flow properties of slips of different kaolin clays, even slips of clays of the same chemical analysis and particle size distribution. Thus, there is no accepted explanation as to why a raw clay from one location in a mine can be fractionated into coarse and fine cuts, each of which has a high viscosity, while a raw clay from another location in the same mine can be fractionated into the same cuts and the resulting fine cut may have a high viscosity and the coarse cut may have a low viscosity.

The invention results from the hypothesis, based on extensive considerations of chemical analysis, particle size distribution, surface area and X-ray diffraction data, that variation in rheological properties of high solids aqueous slips of kaolinite results from intraparticle pores in the kaolinite and the further hypothesis that these pores almost invariably arise from a plurality of sources. These hypothesis have led to the development of a novel physical treatment of kaolinite involving two essential steps, described hereinafter. When these steps are carried out in proper sequence, they lead to the conversion of a wide variety of kaolinites into kaolinites of the same chemical composition and usually similar particle size distribution, but whose high solids slips have markedly lower high shear viscosity than the starting kaolinite coupled with significantly reduced dilatancy.

Briefly stated, in accordance with the present invention, a high solids mixture of kaolinite and water is initially subjected to intensive mechanical work, as by pugging with a high energy input, and the worked clay is then subjected to hydrothermal treatment under superatmospheric pressure.

In accordance with a preferred form of this invention, the pH of the clay during the mechanical working step is within the range of 3 to 7 so that the clay is in a flocculated or semiflocculated condition and, further, the pugging treatment is carried out in the absence of clay dispersants. With most pugging equipment, the presence of clay dispersants (other than any sodium hydroxide employed to adjust pH of the clay up to about 7) appears to necessitate an increased power expenditure over that required when clay dispersants are absent.

The process of this invention brings about exceptional high shear viscosity reduction when applied to the primary kaolins, as exemplified by English kaolin clays. The process of this invention is also applicable to the treatment of crude (unfractionated) secondary kaolin clays or to a fine size fraction of the clay obtained by any of the usual classification procedures. Coarse size fractions of kaolins which are normally considered to be completely unsuited for high speed paper coating operations because of their unusually high viscosity and extreme dilatancy also be benefited by the treatment.

The first step of the process of this invention, namely, the step of mechanically working a high clay solids system, has been found to have but little effect on reducing the high shear viscosity of concentrated slips of most very fine particle size fractions of kaolinite employed in paper coating, e.g., cuts having an average equivalent spherical diameter of about 0.5 to 0.7 micron. However, this step does impart a unique rheological property to slips of fine particle size clay which can probably be best designated as "viscoelasticity" and is manifest by continuous or discontinuous zigzag tracings on a Hagan rheogram or on a stress-rate of strain curve having coordinates calculated from the rheogram. Hydrothermal treatment of an unworked fine size fraction of clay usually results in a modest degree of high shear viscosity reduction of the clay. However, when a fine size fraction of kaolinite is first mechanically worked to an extent sufficient to produce an intermediate clay material exhibiting the unique, but undesirable viscoelastic effect, and the worked clay is thereafter hydrothermally treated, the dilatancy and high shear viscosity of the resultant clay product are markedly less than the dilatancy and high shear viscosity of the starting clay and the viscoelastic character of the intermediate worked clay disappears. Thus, the working step and hydrothermal step function synergistically to produce results not predictable on the basis of he response of the fine kaolinite to either step taken alone. The effect of the combined treatment is especially noteworthy with primary kaolin coating clays.

On the other hand, whole clay, or a fraction of clay having an average equivalent spherical diameter greater than about 0.8 micron, normally responds somewhat more favorably to the working step than does a finer size of the clay. Thus, when such clay is pugged with a high energy input, the high shear viscosity of the clay is reduced. The worked clay may also exhibit viscoelasticity when it has an appreciable content of very fine clay particles. However, the high shear viscosity reduction obtainable merely by working most raw clays is usually completely inadequate even when considerable work is put into the clay. On the other hand, when the whole clay is subjected to the hydrothermal treatment without a previous working step, there usually results only a very modest decrease in high shear viscosity, a reduction which is insufficient for most purposes. As in the case of finer size fraction of kaolin, when the whole clay is first worked and thereafter subjected to high pressure saturated steam treatment, the high shear viscosity reduction that is obtained usually markedly exceeds the reduction that would be expected from the behavior of clay which has merely been subjected to any one of the steps, but not both.

In the case of coarse size fractions of kaolin, such as the 5 micron fraction usually discarded as a waste by-product in the fractionation of whole clay to recover a fine cut for use as a paper coating pigment, considerable viscosity reduction can be achieved by a moderate amount of pugging alone. The viscosity reduction obtainable in this manner is generally inadequate, however, to render the clay suitable for use as a paper coating pigment. While little, if any, further viscosity reduction is achieved by hydrothermally treating mildly pugged clay, it has been unexpectedly found that by subjecting the coarse size fraction of kaolinite to severe pugging, considerably more severe than will suffice for most kaolinites, the pugged kaolinite will respond to hydrothermal treatment to produce a material possessing the characteristics of a "normal viscosity" or even a "low viscosity" kaolin. Thus, the process of this invention affords a promising method for converting a waste clay into a valuable pigment for the coating industry.

These facts indicate the working step and the hydrothermal step are interdependent and that the working step puts the clay, especially the fine size particles of kaolin, into a condition in which the hydrothermal treatment has an effect on the clay which it does not have in the absence of the working step.

In accordance with one form of this invention, the whole clay is worked and then fractionated to separate a coarse size fraction having an average equivalent spherical diameter greater than 2 microns and one or more fine cuts having an average equivalent spherical diameter 1 micron or finer. The fine cut is then separately subjected to hydrothermal treatment to provide low viscosity clay of particle size distribution normally used in paper coating work. In many cases, an outstanding and unexpected increase in the total yield of fine cut can be obtained in this way. Thus, for example, a raw clay which is normally fractionated into about 50 parts by weight of a coarse cut having an average equivalent spherical diameter of about 5 microns and 50 parts by weight of a fine paper coating fraction having an average equivalent spherical diameter of about 0.8 micron, was able to be fractionated into 40 parts by weight of 5 micron clay and 60 parts of 0.8 micron clay after the raw clay was pugged.

The clay treating method described above has been found to produce remarkable results when applied to a variety of kaolinitic clays. Thus, for example, the apparent viscosity of a 70% solids slip of a commercial high viscosity Georgia coating clay was reduced from a value in excess of 18.7 poises at a shear rate of 1530 sec. —1 to 1.0 poise at 4820 sec. —1 by pugging the clay for 6 hours in an open pug mill and heating a diluted slip of the pugged clay in an autoclave at a saturated steam pressure of 800 p.s.i.g. for 6 hours. An English coating clay having a high apparent viscosity value in excess of 18.7 poises (1530 sec. —1) for a 66.5% solids slip was improved by pugging and hydrothermal treatment to the extent that the apparent viscosity of a 70% solids slip of treated kaolinite was only 1.1 poises at 4820 sec. —1. The treatment can also be used to improve domestic gray kaolin, an abundant form of kaolinite which frequently has unusually high viscosity and is considered completely unsuitable for paper coating use. The viscosity of a gray kaolin from Georgia was reduced from about 5.6 poises at 4820 sec. —1 for a slip containing about 66% solids to an apparent viscosity of only 1.5 poises at 4820 sec. —1 for a slip of about the same solids content.

Raw kaolin clay, as mined, can be used as a starting material in the process after the clay has been crushed. A commercial kaolin coating clay fraction can also be used. Kaolinite which has been heated to the extent that water of crystallization has been eliminated from the mineral lattic responds to working and hydrothermal treatment in a different manner from kaolinite in its natural hydrous condition and the dehydrated kaolinite is not benefited by the treatment of this invention. Therefore, the use of calcined clay as a starting material is outside the scope of this invention. A clay consisting predominantly of the clay mineral kaolinite must be employed in carrying out the process. Substantially pure kaolinite, free from bentonitic clay, is recommended since the presence of any bentonite can have a markedly adverse effect on the end product. On the other hand, small amounts of micaceous mineral impurities such as occur in English clays, do not appear to be detrimental. As mentioned above, the starting clay can be whole clay (which usually has an average equivalent spherical diameter of about 0.8 to 2 microns) or it can be a fine size fraction of whole clay, e.g., a clay having an average equivalent spherical diameter of 0.5 to 0.8 micron. A coarse size friction of clay, such as a material having an average equivalent spherical diameter of 5 microns, can also be used.

In putting this invention into practice, the clay is put into a condition at which it responds properly to the application of mechanical work by mixing the clay with water to a clay solids content within the range of about 69% to about 80% (i.e., 69 to 80 parts by weight of bone dry clay to 31 to 20 parts by weight of water). Kaolinite slips having a moisture content lying within this range have a puggable consistency. Kaolinite masses having a lower water content are friable and resist work applied thereto. On the other hand, more dilute clay-water systems are semifluid or fluid. In order to apply work to low solids fluid slips, high shear rate conditions must be used. Clay that has been worked under these conditions does not respond to hydrothermal treatment as does clay that has been plugged in accordance with this invention. The optimum clay solids content of the puggable mixture will vary with the presence or absence of additive fluocculants or deflocculants and will vary inversely with the degree of flocculation of the clay. The pH of the puggable mix consisting solely of clay and water is normally about 4 to 5 and may be reduced somewhat to a pH as low as about 3 by incorporation of a mineral acid such as hydrochloric, sulfuric or phosphoric, or increased up to a pH of about 7 by addition of an alkali metal hydroxide, such as sodium hydroxide or potassium hydroxide. At a pH in excess of 7, the degree of deflocculation of the clay increases, resulting in an undesirable increase in the work input required to obtain a given result in the working step. Moreover, the ultimate high shear viscosity of the finished clay may be somewhat higher, all other things being equal, when deflocculated clay is employed in either the working step or hydrothermal step. Therefore, it is recommended that all clay dispersants be absent from the feed clay during the working step.

The working step can be carried out in any agitating equipment capable of kneading the moist clay mix. Pug mills of the worm or screw type, such as are employed by the clay industry, can be used, as can pug mills which are provided with sigma blades. The mixing equipment can be batch type or continuous and it can be opened or closed. Suitable mills operate on the clay in a manner such as to shear moist clay particles, one over the other, by a kneading action (as opposed to a shattering or grinding action). Satisfactory results have been obtained in a closed pug mill of the type containing two parallel shafts rotatable in the opposite direction. Each shaft carries a series of cams, with the cams oriented so that there is a clearance of about $\frac{1}{32}''$ between cams carried on the different shafts. Clay is conveyed by a screw through the clearance between the cams and is extruded against back pressure through an opening which may be about $\frac{1}{32}''$ to $\frac{1}{2}''$.

The minimum amount of work input to the clay will vary with the rheological properties of the starting clay and, generally speaking, more work input will be required with a high viscosity starting clay than with a low viscosity starting clay. The work input will generally vary within the range of about 10 to about 125 hp. hours per ton of bone dry clay being treated. However, with some especially viscous clays, such as a coarse size fraction of crude clay, a work input of about 150 to 175 hp. hours per ton is recommended. With most clays a work input of 30 to 75 hp. hours per ton of dry clay will suffice. While overpugging may result in an intermediate kaolinite product whose slips are characterized by excessive thixotropy, this defect is remedied in the subsequent hydrothermal treatment during which any undesirable rheological properties imparted to the clay during pugging are eradicated. Thus, only economics appears to limit the extent of pugging. Pugging times are generally within the range of ½ to 12 hours in open mills while a pugging time of a few seconds to a few minutes will suffice in closed mills.

The pugged clay, without the necessity of a preliminary drying step, is preferably diluted with water before being subjected to hydrothermal treatment. For practical reasons, it is preferable to apply hydrothermal treatment to aqueous slips of pugged clay which are distinctly fluid and contain substantially more water than employed in the working step. Optimum results are obtained with the preferred clay feed (which has a pH of 3 to 7 and is free from clap dispersants) by diluting the pugged clay to about 25% to 33% clay solids before hydrothermal treatment. Clay which has been pugged in the presence of clay dispersants or pugged clay to which dispersants have been added (as during a hydraulic classification of pugged crude to obtain a fine cut) can be hydrothermally treated at clay solids as high as 50% to 70%. During hydrothermal treatment the presence of phosphatic clay dispersants, such as tetrasodium pyrophosphate, is undesirable when the hydrothermal treatment is carried out under conditions of temperature and pH at which appreciable hydrolysis of the phosphatic clay dispersants occur. The dispersing action of this class of materials is impaired by hydrolysis and if appreciable hydrolysis occurs the hydrothermally treated clay product will contain an undesirable quantity of salts if an attempt is made to compensate by addition of sufficient dispersant to maintain the kaolin in a deflocculated condition.

Hydrothermal treatment is carried out in any suitable pressurized equipment, such as an autoclave. The treatment can be conducted at a temperature within the range of about 300° F. to about 550° F. and at a pressure at least equal to saturated stream pressure at said temperature, whereby at least some of the water is in liquid state. For example, the hydrothermal treatment can be carried out under autogenous pressure with saturated steam at a pressure within the range of about 100 p.s.i.g. to 1000 p.s.i.g. by heating the slip of worked clay in an autoclave until the water in the autoclave reaches a temperature of about 317° F. to about 545° F. corresponding to saturation temperature at said pressures. Pressures in excess of autogenous pressure can be used. The system can be pressurized hydraulically by a suitable pump or by introduction of an inert gas. In fact, it is within the scope of this invention to operate under sufficient pressure to maintain substantially all of the water in liquid phase during hydrothermal treatment. Particularly good results have been realized at temperatures of about 440° F. to about 520° F., the pressure being sufficient to cause at least some water to be in liquid state. The duration of hydrothermal treatment will range from a few seconds after pressure has been attained to 6 hours or more and, all other variables being constant, will vary inversely with steam pressure. Thus, for example, only a second or so at a saturated steam pressure of about 400 p.s.i.g. (about 445° F.) may suffice, although the system may be held at such pressure and temperature for several hours without deleterious effect. On the other hand, a period of one hour may be needed at a saturated steam pressure of 200 p.s.i.g. (about 385° F.) or 6 hours at 100 p.s.i.g. (about 317° F.) It has been found that when the worked kaolinite is subjected to hydrothermal treatment at temperatures appreciably greater than about 550° F. for prolonged time, the flow properties of slips of the processed kaolinite are adversely affected. For example, when hydrothermal treatment was conducted at a saturated steam pressure of 2400 p.s.i.g. for several hours, the high shear viscosity of the autoclaved pugged kaolinite was found to be no better than that of the pugged clay without any subsequent hydrothermal treatment. In practice it may be difficult to restrict the residence time of the worked clay in the equipment used for hydrothermal treatment to a period of time sufficiently short to permit satisfactory operation at temperatures in excess of 550° F. Employing a temperature appreciably less than about 300° F., the time required to obtain the desired reduction in high shear viscosity of worked clay may be beyond practical limits. It has been found that the results obtained by autoclaving worked clay with saturated steam at 14.7 p.s.i.g. for 24 hours were inferior to results obtained by autoclaving the same worked clay under a saturated steam pressure of 200 p.s.i.g. for a few hours.

After hydrothermal treatment, the clay slip is partially dewatered, as by a rotary filter, deflocculated and spray dried. Any of the usual clay dispersants (deflocculating agents) can be used to deflocculate the slip, as examples of which may be mentioned sodium hexametaphosphate and tetrasodium pyrophosphate. The product is useful in the production of coating colors made with adhesives such as starch, latex and casein.

This invention will be more fully understood by the following examples wherein all viscosity measurements, unless otherwise indicated, were made on a Hagan Viscometer. In the Hagan instrument, the torque-r.p.m. curve is recorded on a circular graph. In this graph, bob speed is represented as a percentage of maximum bob speed and is recorded by figures around the outside circumference of the graph. Torque, which is represented on the graph as a percentage of maximum torque, is recorded radially on the circular graph. Absolute values of rate of shear in sec. −1 are calculated by multiplying the percent of maximum speed by 108. Absolute values of torque (shearing force) in dyne-cm. are calculated for the medium bob and medium torque linkage by multiplying the percentage of maximum torque recorded on the Hagan rheogram by $1.25 \times 10^4$. Apparent viscosity in poises can be obtained by dividing the shearing force per unit area by the rate of shear. Since the apparent viscosity is inversely proportional to rate of shear at a given shearing force (torque), a fluid of highest apparent viscosity is indicated by a rate of shear-stress curve with maximum shearing force at a minimum rate of shear.

All samples investigated with Hagan Viscometer were prepared in the following manner in order to keep the degree of deflocculation and clay solids content at values approximating those employed in "making down" clays for paper coating use. Clay was dried to 105° C. and the following solutions added to the clay in the order given: distilled water; 1N solution of $Na_6P_4O_{13}$ in amount of 0.3%, based on the dry clay weight, and 1N NaOH to bring the pH to 7, as measured with a pH meter. The dispersed slip was then brought to 70±0.2% solids (unless otherwise indicated) on a Cenco Moisture Balance by addition of an appropriate amount of distilled water.

The prepared sample was placed in the cup of the Hagan instrument and the bob lowered into the sample. The machine was turned on and the hand crank which activates the transmission was turned at a speed of 1 r.p.m. until either 100% torque or a speed 80% of scale (the maximum speed obtainable with the Hagan instrument) was reached. The downcurve of the rheogram was then obtained by operating the hand crank in the same manner employed in obtaining the upcurve. A circular rheogram recording variation of torque with rate of shear (as indicated by bob speed) was automatically traced out.

All clay particle sizes referred to herein represent the size of the ultimate clay particles and are reported as equivalent spherical diameters (e.s.d.) in microns. Particle size was determined by sedimentation procedure described in TAPPI Standards, T649 sm–54; particle size in ranges below 0.5 micron were determined by a simple modification of the TAPPI method which provided for the use of a long arm centrifuge, as described in a publication by F. H. Norton and S. Speil in J. Am. Ceramic Soc., 21:89 (1938).

*Example I*

(a) FIGURE 1 shows three shearing stress-rate of strain curves. Coordinates for each of these curves were obtained by converting values on a Hagan circular chart to rectilinear coordinates. The first curve, Curve A, is a rheogram of a 70% slip of the starting clay, a commercial chemically bleached paper coating grade of clay supplied to the trade as "HT" clay. This clay, rated as a "normal" viscosity clay, is a cut of raw Georgia kaolinite and has an average equivalent spherical diameter of about 1.0 micron. The pH of a 1% slurry of this clay in water is about 4.5. Curve B represents a rheogram of the HT clay after being pugged with water in an open pug mill for 6 hours. Curve C is the rheogram of a portion of the HT clay which, after being pugged for 6 hours, was autoclaved with saturated steam at 400 p.s.i.g. for 2 hours, in accordance with this invention.

In preparing the sample the rheological properties of which are represented by curve C, a portion of the pugged clay was diluted with water to 33⅓% clay solids without an intermediate drying step. No material other than water was added to the pugged clay. The resultant slip was in a flocculated condition due to the acid nature of the clay. The slip was subjected to hydrothermal treatment with saturated steam in an 1100 cc. autoclave. The temperature required for the desired saturated steam pressure was obtained by electrically heating the autoclave. One hundred milliliters of distilled water were placed in the bottom of the autoclave followed by a 400 milliliter 96% silica (Vycor) beaker containing the 33⅓% slip of pugged clay. The steam pressure was brought to 400 p.s.i.g. by the electrical heating unit and the pressure in the autoclave was maintained at 400 p.s.i.g. for 2 hours. Pressure was then reduced to atmospheric by cutting off the heat supply to the autoclave. The autoclaved slip was oven dried at 105° C. and pulverized.

FIGURE 1 (curve A) shows that a 70% slip of the starting clay had a torque of about $2.5 \times 10^5$ dyne-cm. at a shear rate of only about 864 sec.—1. When the clay was pugged, the torque of about $2.5 \times 10^5$ dyne-cm. was obtained at a rate of shear of about 3240 sec.—1 (curve B). On the other hnad, when the clay was autoclaved after pugging, in accordance with this invention, a torque of somewhat less than $2.5 \times 10^5$ dyne-cm. was reached at a maximum rate of shear of 8640 sec.—1. The curves show also that with untreated clay, shearing force increased from 0 to $12.5 \times 10^5$ dyne-cm. as rate of shear increased from 0 to about 1620 sec.—1. The shearing force on clay which was merely pugged increased from a value of zero up to $6.25 \times 10^5$ dyne-cm. as rate of shear increased from 0 to 8640 sec.—1. As mentioned, the maximum shearing force developed by the slip of clay treated, in accordance with this invention, was less than $2.5 \times 10^5$ dyne-cm. at 8640 sec.—1. The rheograms in FIGURE 1 therefore demonstrate that a noteworthy reduction in viscosity of high solids clay slips at high rates of shear can be brought about by treating kaolin clay by the process of this invention. The rheograms also illustrate the superiority of clay processed in accordance with this invention to clay which has merely been pugged.

Curve C in FIGURE 1 shows that a noteworthy decrease in slip dilatancy is achieved by treating clay by pugging and autoclaving and that the reduction in dilatancy is not achieved by merely pugged the clay. Thus, it will be noted in curve A that the shearing force at a shear rate of 648 sec.—1 was about $1.25 \times 10^5$ dyne-cm. and shearing force was $12.5 \times 10^5$ dyne-cm. at 1620 sec.—1. If the clay slip had Newtonian properties, the expected shearing force at a rate of shear of 1620 sec.—1. would have been $1.25 \times 10^3 \times 1620/648$ or $3.1 \times 10^5$ dyne-cm. The measured torque of $12.5 \times 10^5$ dyne-cm. at a rate of shear of 1620 sec.—1 was about four times as great as that which would have been obtained with a Newtonian fluid, indicating that the 70% solids slip of the starting clay was highly dilatant. On the other hand, if the slip of pugged clay (curve B) had Newtonian flow properties, shearing force would have increased from $0.1 \times 10^5$ to $2.0 \times 10^5$ dyne-cm. as rate of shear increased from 432 sec.—1 to 8640 sec.—1. However, torque actually increased from $0.1 \times 10^5$ dyne-cm. at 432 sec.—1 to $6.0 \times 10^5$ dyne-cm. at 8640 sec.—1, about three times the increase of a Newtonian fluid. Thus, the pugged clay was still highly dilatant, although somewhat less dilatant than the slip of starting clay. The slope of curve C, representing the flow properties of clay produced in accordance with this invention, indicates that the pugged, autoclaved clay was only slightly dilatant, materially less dilatant than either the slip of the starting clay or the slip of pugged clay. Thus, with the slip of the treated clay, shearing force increased from about $0.3 \times 10^5$ dyne-cm. at a shear rate of 2160 sec.—1 to only about $2.2 \times 10^5$ dyne-cm. at a maximum shear rate of 8640 sec.—1. The increase of torque to $2.2 \times 10^5$ dyne-cm. at 8640 sec.—1 was only about two times the increase that would have resulted with a Newtonian fluid, as compared with a three-fold increase with pugged clay and a four-fold increase with the starting clay.

(b) To determine whether working and hydrothermal treatment of kaolin clay also reduces low shear viscosity of a high solids slip of the clay, viscosities of 70% deflocculated slips of each of the starting HT clay, pugged HT and pugged and autoclaved HT clay were measured on a Brookfield Viscometer at 10, 20, 50 and 100 r.p.m. with the results reported in Table I. All clay slips were deflocculated with 0.3% by weight of $Na_6P_4O_{13}$.

TABLE I.—LOW SHEAR FLOW PROPERTIES OF CLAY SLIPS

| Rate of Shear | Brookfield Viscosity of 70% Deflocculated Slip, cp. | | |
|---|---|---|---|
| | HT Clay | HT Clay Pugged 6 hrs. | Pugged HT Clay Autoclaved at 400 p.s.i.g./2 hrs. |
| 10 r.p.m | 220 (#2 Spindle) | 67 (#1 Spindle) | (#1 Spindle). |
| 20 r.p.m | 154 (#2 Spindle) | 53 (#1 Spindle) | 84 (#1 Spindle). |
| 50 r.p.m | 122 (#2 Spindle) | 53 (#1 Spindle) | 74 (#1 Spindle) |
| 100 r.p.m | 140 (#2 Spindle) | 65 (#1 Spindle) | 72 (#1 Spindle) |

From a study of the data reported in Table I in light of the results shown in FIGURE 1, it can be concluded that the reduction in the high shear viscosity of slips of clay by pugging and autoclaving the clay is accompanied by a reduction in low shear viscosity of slips of the clay. However, it is very obvious that reduction in low shear viscosities, as recorded on the Brookfield instrument, is small as compared with reduction in viscosity at shear rates of the magnitude measured on the Hagan Viscometer. It is significant to note that the low shear rate viscosities of the slip of clay which had merely been pugged are also appreciably lower than the low shear rate viscosities of the slip of starting clay. This is not true of high shear flow properties (as determined by the Hagan instrument) since the hydrothermal treatment imparts to pugged clay a further large reduction in high shear viscosity.

(c) Coating colors were made up with untreated HT clay, pugged HT clay and pugged "HT" clay which had also been hydrothermally treated. Drawdown coatings were made on standard raw stock from each of the coating colors. Results of the study indicated a consistent reduction in adhesive (starch) demand as a result of the pugging and hydrothermal treatment.

*Example II*

Figure 2:
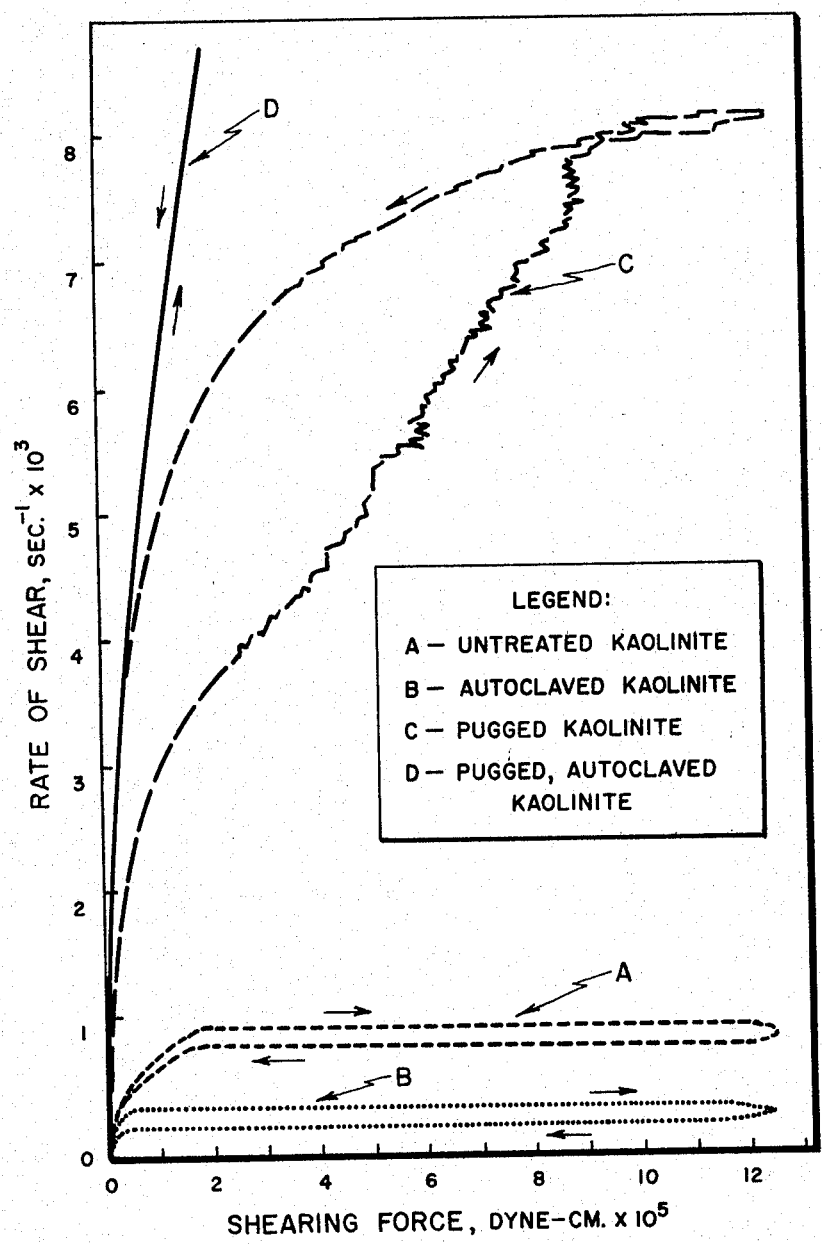

(a) FIGURE 2 (curve A) represents the stress-rate of strain relationship (obtained from a Hagan rheogram) of a 70% solids deflocculated slip of a 0.6 micron average equivalent spherical diameter kaolin fraction obtained by hydraulic classification of a well-crystallized kaolinite from Georgia. This particular clay is considered to be a highly viscosity clay. Curve B in the same figure represents the stress-rate of strain relationship of a 70% solids deflocculated slip of the same clay after a 33⅓% solids slip of the clay had been autoclaved with saturated steam at 800 p.s.i.g. for 6 hours, dried at 105° C. and pulverized. Curve D represents the stress-rate of strain relationship of a 70% deflocculated slip of the same fine size fraction which had been pugged for 12 hours at 69% solids without additives in the open Read mill and then, without drying, had been diluted with water to 33⅓% solids and autoclaved with saturated steam at 800 p.s.i.g. for 6 hours, dried at 105° C. and pulverized. For purposes of comparison, a stress-rate of strain curve of a 70% solids deflocculated slip of the pugged clay without hydrothermal treatment is also plotted in FIGURE 2. This rheogram is designated curve C.

From curve A in FIGURE 2 it can be seen that the 70% solids slip of starting clay was highly dilatant and had a shearing force of about $12.5 \times 10^5$ dyne-cm. at at a rate of shear of only about 900 sec. $-1$. Curve B in FIGURE 2 illustrates that mere hydrothermal treatment of the clay increased the high shear viscosity of the clay and did not reduce the dilatancy. The zigzag in the upcurve of curve C of FIGURE 2 represents what is probably a viscoelastic effect imparted to the clay by pugging without subsequent hydrothermal treatment. This effect (more pronounced in curve C of FIGURE 2 than in curve B of FIGURE 1) would appear to be caused by repeated tensile failure of fluid between the cup and bob followed by relaxation of stress on the fluid. Curve C in FIGURE 2 shows that mere pugging of the fine size clay cut decreased this viscosity of the clay somewhat. Curve D, however, shows that pugging combined with hydrothermal treatment converted the normally dilatant high viscosity clay into a very low viscosity clay having materially reduced dilatancy.

Apparent viscosity values (at rates of shear corresponding to those selected in giving specifications for coating clays) were calculated from the slopes of curves in FIGURE 2 with the following results:

TABLE II.—APPARENT HIGH SHEAR VISCOSITY OF TREATED CLAYS

| Clay Sample | | Apparent Viscosity, poise |
|---|---|---|
| Pugging Time, hours | Hydrothermal Conditions | |
| None | None | >18.7 (1,530 sec. $-1$). |
| None | 800 p.s.i.g./6 hrs | >18.7 (1,530 sec. $-1$). |
| 12 | None | 2.1 (4,820 sec. $-1$). |
| 12 | 800 p.s.i.g./6 hrs | 0.3 (4,820 sec. $-1$). |

(b) The particle size distribution and surface area of the starting clay, pugged clay and pugged and autoclaved clay were measured to determine the effect of the pugging or combined pugging and autoclaving steps on the clay. Results are summarized in Table III.

is the opposite of that of either step alone. Thus, while autoclaving alone increased the 0.8–1μ content of the kaolin by 3% and pugging increased the content of this fraction by 2%, hydrothermal treatment following pugging did not alter the content of 0.8–1μ clay. Similarly, autoclaving and pugging decreased the minus 0.2μ content by 3% and 5%, respectively, while the combined treatments decreased the minus 0.2μ clay by only 1%. Generally speaking, the particle size distribution of the pugged and autoclaved clay did not differ appreciably from that of the starting clay.

Data in Table III show that autoclaving tended to decrease the surface area of the clay while pugging tended to increase surface area. The surface area of clay subjected to these two steps was a reflection of these two trends and did not differ significantly from that of the starting clay.

*Example III*

This example illustrates an embodiment of the process of the present invention wherein a crude kaolinite is extensively pugged, the pugged clay fractionated, and an aqueous slip of a fine size paper coating fraction of the worked crude is then subjected to high pressure saturated steam.

The crude was an unbleached sedimentary Georgia kaolin clay composed of well-crystallized kaolinite. The crude is rated as a "low viscosity" clay, and a 72% clay solids deflocculated aqueous slip of the clay exhibits a torque of $12.5 \times 10^5$ dyne-cm. at a shear rate of 4104 sec. $-1$.

1100 grams of the crude were pugged with water at 73.8% solids in the open Read mill for 12 hours. No chemicals were added during the pugging.

The pugged clay was deflocculated at 12.5% solids with 1N NaOH and a fine cut (average particle size of 1.1 microns e.s.d.) obtained in a basket centrifuge. The fine fraction was flocculated with sulfuric acid, poured onto a Buchner funnel and the residue adjusted with water to 33⅓% solids. The autoclaved product was washed to 8000 ohm-cm. specific resistance with distilled water. Hydrothermal treatment was carried out at 800 p.s.i.g. for 6 hours.

Hagan rheograms were obtained for (1) a deflocculated 72% clay solids slip of the crude, (2) a 72% deflocculated slip of the pugged crude, and (3) a 70% deflocculated slip of the autoclaved fraction which had been cut from the pugged crude. A rheogram was also obtained for the same fine cut of crude before pugging.

It was found, surprisingly, that the untreated fine size fraction obtained from the low viscosity crude was a high viscosity clay. A 70% slip of the untreated fine cut of clay was dilatant and reached 100% torque at only about 7% of bob scale (corresponding to a shearing force of $12.5 \times 10^5$ dyne-cm. at 756 sec. $-1$). Intensive pugging of the crude improved the rheological properties of the TABLE III.—PARTICLE SIZE DISTRIBUTION, AVERAGE PARTICLE SIZE AND SURFACE AREA OF TREATED HIGH VISCOSITY FINE CUT OF KAOLIN

| Particle Size Range | Untreated Wt. percent | Autoclaved 800 p.s.i.g./6 hrs. | | Pugged 12 hrs. | | Pugged 12 hrs. and autoclaved 800 p.s.i.g./6 hrs. | | |
|---|---|---|---|---|---|---|---|---|
| | | Wt. percent | (1) | Wt. percent | (1) | Wt. percent | (1) | (2) |
| >4μ | 1 | 0 | $-1$ | 2 | $+1$ | 2 | $+1$ | 0 |
| 3–4μ | 1 | 3 | $+2$ | 4 | $+3$ | 3 | $+2$ | $-1$ |
| 2–3μ | 6 | 5 | $-1$ | 5 | $-1$ | 4 | $-2$ | $-1$ |
| 1.5–2μ | 6 | 6 | 0 | 5 | $-1$ | 4 | $-2$ | $-1$ |
| 1.0–1.5μ | 14 | 13 | $-1$ | 14 | 0 | 17 | $+3$ | $+3$ |
| 0.8–1μ | 10 | 13 | $+3$ | 12 | $+2$ | 10 | 0 | $-2$ |
| 0.6–0.8μ | 12 | 15 | $+3$ | 14 | $+2$ | 13 | $+1$ | $-1$ |
| 0.4–0.6μ | 21 | 19 | $-2$ | 19 | $-2$ | 15 | $-6$ | $-4$ |
| 0.2–0.4μ | 20 | 20 | 0 | 21 | $+1$ | 24 | $+4$ | $+3$ |
| <0.2μ | 9 | 6 | $-3$ | 4 | $-5$ | 8 | $-1$ | $+4$ |
| 50% finer than, μ | 0.6 | 0.66 | | 0.68 | | 0.64 | | |
| Surface area, m.²/g. (3) | 15.1 | 14.0 | | 17.4 | | 14.4 | | |

(1) Percent change from untreated. (2) Percent change from pugged sample. (3) By B.E.T. method.

Data in Table III indicate that pugging and autoclaving each taken singly have generally the same effect on most particle size ranges of the clay. Surprisingly, autoclaving following pugging has an effect on most size ranges which clay, although the rheogram of the pugged crude exhibited a typical "thixotropic" loop. However, by fractionating the pugged clay and subjecting the fine cut of clay to the action of high pressure saturated steam, the viscosity of the clay was dramatically reduced at all shear rates. The rheogram of a 70% deflocculated slip of the pugged, fractionated, hydrothermally treated clay was free from the thixotropic loop present in the rheogram of the pugged crude. This rheogram, converted to rectangular coordinates was substantially the same as curve C of FIGURE 1, with the exception that maximum shearing force was about $2.8 \times 10^5$ dyne-cm. at a shear rate of 8640 sec. $-1$, instead of a maximum shearing force of somewhat less than about $2.5 \times 10^5$ dyne-cm. at 8640 sec. $-1$. The apparent viscosity of the slip of autoclaved fraction of pugged crude was calculated to be 0.8 poise at 4820 sec. $-1$, a marked improvement over each of the following: the slip of the crude, which had an apparent viscosity of 8.8 poises at 1530 sec. $-1$, the slip of pugged crude or the slip of 1.1 microns e.s.d. untreated fine cut of the same crude (each of which was found to have an apparent viscosity in excess of 18.7 poises at 1530 sec. $-1$.)

*Example IV*

A commercial unbleached high viscosity English coating clay, "SPS English clay," was treated in accordance with this invention. The viscosity of this primary clay is exceptionally high as compared with domestic kaolinites. Thus, a 66.5% solids deflocculated slip of this clay has a Hagan bob velocity of only 2% of scale at 100% torque (corresponding to a shearing force of $12.5 \times 10^5$ dyne-cm. at a shear rate of 216 sec.$-1$ and a 70% solids slip is out of the range of the instrument using the medium bob. The high shear viscosity of the clay that had been treated in accordance with this invention was compared with that of the starting clay and the clay processed merely by pugging alone in the open pug mill or hydrothermal treatment alone. Pugging was carried out in the open Read mill without addition of chemicals. Autoclaving was carried out with saturated steam employing 33⅓% solids slips free from chemical additives. Results are summarized in Table IV.

TABLE IV.—THE EFFECT OF PUG MILLING AND AUTOCLAVING UPON THE FLOW PROPERTIES OF SLIPS OF ENGLISH COATING CLAY

| Pugging Time, hours | Hydrothermal Treatment | Apparent Viscosity, poises | Solids At Which Viscosity Evaluated, Percent |
|---|---|---|---|
| None | None | >18.7 (1,530 sec. −1). | 66.5 |
| Do | 800 p.s.i.g./6 hrs. | >18.7 (1,530 sec. −1). | 66.5 |
| 12 | None | 2.2 (4,820 sec. −1). | 66.7 |
| 12 | do | 6.3 (4,820 sec. −1). | 70 |
| 12 | 400 p.s.i.g./2 hrs. | 1.1 (4,820 sec. −1). | 70 |

Results shown in Table IV demonstrate that English coating clay responded dramatically to the process of this invention and that neither pugging nor hydrothermal treatment alone produced the desired results. The data indicate that the abnormally high viscosity clay could be improved by combining pugging and autoclaving to meet the commercial coating clay specification of a maximum apparent viscosity of 1.8 poises at a shear rate of 4820 sec. $-1$. for a 70.5% solids slip.

*Example V*

(a) An aqueous slip of coarse size fraction of Georgia kaolinite (5 microns e.s.d.) was mechanically ground with −10 +35 mesh silica sand to provide a 1 micron e.s.d. kaolinite fraction free from sand. The grinding procedure is described in U.S. 3,097,801 to James B. Duke. The ground clay product was found to have exceptionally high viscosity (a result apparently attributable to the particular method of grinding). For this reason, the ground kaolinite was unacceptable as a paper coating clay, as was the starting coarse size fraction of clay. Thus, a 64% solids slip of the ground clay had a $12.5 \times 10^5$ dyne-cm. torque at only 216 sec. $-1$ rate of shear as compared with a normal viscosity clay whose 70% solids slip had $12.5 \times 10^5$ dyne-cm. of torque at a shear rate of 1188 sec. $-1$ or a low viscosity clay whose 70% solids slip has $12.5 \times 10^5$ dyne-cm. torque at 5940 sec. $-1$.

By pugging the ground clay at 74% solids for 12 hours in the open Read mill and autoclaving the pugged clay at 33⅓% solids with saturated steam at 400 p.s.i.g. for 2 hours, the apparent viscosity of a 64% deflocculated aqueous slip of the clay was reduced from a value in excess of 18.7 poises at 1530 sec. $-1$ for the starting clay to a viscosity of only 1.5 poises at 4820 sec. $-1$ for a 64.5% slip of treated clay. The apparent viscosity of a 64.4% slip of the clay after pugging 12 hours in the open Read mill but before autoclaving was 4.2 poises at 4820 sec. $-1$. This apparent viscosity was almost three times as great as the apparent viscosity of the clay which had been treated in accordance with this invention. It is significant to note that while the work input on this particular clay had sufficed to achieve exceptional results with other clays (e.g., the clay of Example II) the work input was not adequate for this particular clay to achieve optimum results. Thus, with a clay such as the ground clay of this example, a greater work input would result in an autoclaved product which could be slipped at a high solids contents.

(b) Another sample of sand ground kaolinite was processed, in accordance with this invention, as follows. The clay discharge from the sand grinding equipment was thickened by evaporation to 75% solids. This slip was pugged in a screw-type pug mill for 24 hours. The pugged clay was slipped and hydraulically fractionated to recover a product 92% minus 2 microns in the form of an aqueous slip. The slip was flocculated with sulfuric acid, washed to 8000 ohm-cm. specific resistance and slipped at 33⅓% solids with water. The slip of the fractionated clay was heated in an autoclave until a saturated steam pressure of 400 p.s.i.g. was obtained. The slip was maintained at this pressure for 2 hours and then cooled and dried.

It was found that the high shear flow properties of a 71% solids slip of the pugged, hydrothermally-treated fine size fraction of clay corresponded substantially with the properties of 63% solids slips of the sand ground clay after fractionation to a similar fine particle size. In effect, an 8% clay solids increase was realized.

*Example VI*

To demonstrate the calcined kaolin clay does not respond to pugging and hydrothermal treatment as does raw clay, a sample of the HT clay of Example I was calcined at 700° C. for 4 hours. Hagan rheograms were obtained for 67% slips of (1) the calcined clay, (2) the calcined clay after being pugged in the open pug mill for 6 hours, and (3) the calcined clay after being pugged for 6 hours and then autoclaved at 33⅓% solids with saturated steam at 400 p.s.i.g. for 2 hours.

All of the slips of calcined HT clay were found to be as dilatant as the starting clay in contrast with uncalcined clay whose dilatancy was markedly reduced by pugging and autoclaving. Moreover, maximum torque of $12.5 \times 10^5$ dyne-cm. was reached with all slips containing calcined HT clay in contrast with comparable slips of uncalcined HT where this maximum torque was reached only by the untreated clay. The slip of untreated calcined clay reached the maximum torque of $12.5 \times 10^5$ dyne-cm. at a rate of shear of only about 50 sec. $-1$; pugged, calcined clay reached maximum torque of $12.5 \times 10^5$ dyne-cm. at a rate of shear of only about 50 sec. $-1$; pugged, calcined clay reached maximum torque at only about 375 sec. $-1$; and pugged, autoclaved clay at about 25 sec. $-1$. In marked contrast pugged, autoclaved, uncalcined clay had a maximum torque that was less than about $2.5 \times 10^5$ dyne-cm., and this torque was reached at the maximum rate of shear of 8640 sec.$-1$.

*Example VII*

Experiments were carried out to demonstrate the necessity for carrying out the pugging step before the hydrothermal step in a process for reducing high shear viscosity of high solids clay slips.

A sample of a 1 micron e.s.d. cut of Georgia kaolin clay was pugged for 12 hours and Hagan rheograms obtained at this stage as well as following autoclaving the pugged clay at 33⅓% solids with saturated steam at 800 p.s.i.g. for 6 hours. A second sample of the starting clay was treated at 33⅓% solids in another autoclave with saturated steam at 400 p.s.i.g. for 2 hours. A rheogram of a slip of the autoclaved clay was obtained at this stage and another following pugging of the autoclaved slip in an open pug mill (after concentrating the autoclaved slip to puggable consistency). The pugged clay was then subjected to a secondary autoclaving with saturated steam and a rheogram of this product obtained.

Apparent viscosities of slips of the test clays as calculated from Hagan rheograms are summarized in Table V.

TABLE V.—THE EFFECT OF ORDER OF PUG MILLING AND AUTOCLAVING UPON THE FLOW PROPERTIES OF 70% SOLIDS KAOLIN SLIPS

| Sample | Description of Clay | Apparent Viscosity, Poises |
|---|---|---|
| (1) | Untreated clay | >18.7 (1,530 sec. $-1$). |
| (2) | Sample (1) autoclaved 800 p.s.i.g./6 hrs. | >18.7 (1,530 sec. $-1$). |
| (3) | Sample (2) pugged 12 hrs. | 7.5 (1,530 sec. $-1$). |
| (4) | Sample (3) autoclaved 400 p.s.i.g./2 hrs. | {0.8 (1,530 sec. $-1$). 1.3 (4,820 sec. $-1$). |
| (5) | Sample (1) pugged 12 hrs. | {0.6 (1,530 sec. $-1$). 4.0 (4,820 sec. $-1$). |
| (6) | Sample (5) autoclaved 400 p.s.i.g./2 hrs. | {0.4 (1,530 sec. $-1$). 0.5 (4,820 sec. $-1$). |

Data in Table V show that the viscosity of a 70% slip of untreated clay (Sample No. 1) was greater than 18.7 poises at a shear rate of 1530 sec. $-1$. The data show that the viscosity of Sample No. 1 after autoclaving (Sample No. 2) was also greater than 18.7 poises at a shear rate of 1530 sec. $-1$. Thus, hydrothermal treatment alone did not appear to improve the high shear viscosity properties of the clay. In contrast with Sample No. 2, obtained by autoclaving Sample No. 1, Sample No. 5, obtained by pugging Sample No. 1, represented a marked improvement over Sample No. 1. Thus, a 70% slip of pugged clay had a viscosity of 0.6 poise at 1530 sec. $-1$ and 4.0 poises at 4820 sec. $-1$. The viscosity of the pugged clay was considerably improved at each of these shear rates by autoclaving the pugged clay to obtain Sample No. 6. The viscosity of this sample at 4820 sec. $-1$ was reduced from 4.0 poises for the pugged clay to only 0.5 poise for the pugged, autoclaved clay. The data show that this result was not obtained by reversing the sequence of treatment. Thus, clay which was first autoclaved and then pugged, Sample No. 3, had a viscosity of 7.0 poises at a shear rate of 1530 sec. $-1$. Subsequent autoclaving of Sample No. 3 did not overcome the damage to the clay brought out by autoclaving first and then pugging. Thus, the viscosity of a 70% slip of Sample No. 4, obtained by autoclaving the staring clay which had first been autoclaved and then pugged, was only 0.8 poise at 1530 sec. $-1$ and 1.3 poises at 4820 sec. $-1$, as compared with iviscosities of 0.4 poise at 1530 sec. $-1$ and 0.5 poise at 4820 sec. $-1$ for Sample No. 6 obtained without the initial autoclaving step.

*Example VIII*

The water of crystallization of untreated kaolin clays was compared with the water of crystallization of (1) the clays after pugging and (2) the clays after pugging and then autoclaving, in accordance with this invention. All of the clays studied were those that responded favorably to the combined pugging and autoclaving treatment by producing clays of markedly reduced high shear viscosity.

Water of crystallization was calculated as follows: percent water of crystallization $= (L.O.I. - F.M.)/(100 - F.M.) \times 100$. "L.O.I." in the equation represents loss of ignition which is determined by heating the clay to constant weight at 1000° C. F.M. represents free moisture which is determined by heating the clay to constant weight at 105° C.

TABLE VI.—WATER OF CRYSTALLIZATION OF TREATED AND UNTREATED KAOLIN CLAY SAMPLES

| Starting Clay | | Water of Crystallization of Clay Samples | | | |
|---|---|---|---|---|---|
| Average e.s.d., microns | Rated Viscosity | Untreated Clay | Autoclaved 800 p.s.i.g./6 hrs. | Pugged 12 hrs. | Pugged 12 hrs. and Autoclaved 800 p.s.i.g./6 hrs. |
| 0.72 | Low | 14.00 | 13.70 | | |
| 1.0 | Normal | 14.10 | 13.98 | 14.19 | 13.98 |
| 1.1 | Low | 14.72 | | 14.15 | 14.02 |

Data in Table VI show that autoclaving pugged kaolinite reduced somewhat the water of crystallization of the pugged clay to a value below that of the starting clay. Therefore, the effect of the hydrothermal treatment following pugging cannot be explained as a mere hydration of the clay mineral.

*Example IX*

Still in accordance with this invention, a crude low viscosity Georgia kaolin clay was passed through a double shafted pug mill at 81.0% solids to break the clay into 1-inch lumps. The lumps were passed through a Baker Perkin's Ko-Kneader in which water was added to reduce the clay solids to a value of 79.6%. The Ko-Kneader is described and illustrated in the 1963 "Chemical Engineering Catalog CEC," published by Reinhold Publishing Corporation. The lumps were worked in the kneader with a work input of 70.2 hp. hrs./ton. The worked clay was slipped in water at 33⅓% solids without addition of a clay dispersant and the slip was heated in an autoclave to a saturated steam pressure of 400 p.s.i.g. and maintained at that pressure for 2 hours. It was found that the pugged autoclaved clay could be made up into a 77% solids slip having the flow properties of a 71% solids slip of a typical medium viscosity clay.

We are well aware that U.S. 2,535,647 and U.S. 2,907,666, each to Millman, teach the kneading of viscous masses of kaolin clay to reduce the viscosity of the clay. Considerable reduction in viscosity, as measured on the Stormer or Brookfield instruments, can be achieved in this way (see Table I). However, the resutls obtainable by working clay with a high energy input, as determined by the Hagan or Hercules viscometers which are a more reliable index of high shear flow properties, leave much to be desired. This is particularly true of the very fin premium grades of coating clays where mere intensive pugging develops so-called "viscoelasticity" but does not reduce high shear viscosity substantially and does not reduce dilatancy. Such clays, as well as crude unfractionated clay or even a coarse size fraction of clay, are almost invariably further improved to heretofore unexpected levels when treated, in accordance with this invention, by intensive working followed by autoclaving.

We are also aware of the work of Joseph S. Laird who, almost a half century ago, experimented with autoclaving various clays, e.g., flint clay, with an object of improving the plasticity of the clay. Thus, in accordance with the teachings of U.S. 1,275,705 to Laird, raw or calcined clay was subjected to dry or wet steam at elevated temperature. It was also suggested by Laird to combine the steam treatment with a pugging or equivalent grinding to increase the rate of plasticity of the clay and, in the case of pugging, to improve the uniformity of the material. Laird's objective of increasing clay plasticity is obviously diametrically opposed to the present concept of decreasing clay viscosity, or in other words, increasing clay fluidity. Moreover, Laird, who advocated pugging coupled with steam treatment, obviously did not realize or appreciate the response of a substantially pure kaolinite to a combined pugging and hydrothermal treatment in which the pugging is carried out with a vastly greater energy input than usually employed in the ceramic art.

While certain preferred practices of this invention have been described, it will be understood that it may be otherwise embodied within the scope of the following claims.

We claim:

1. a treated kaolinite product having reduced high shear viscosity as a result of having been obtained by pugging uncalcined kaolinite with water with a work input of at least 10 hp. hrs./ton of clay and then having been subjected to the action of hot water at a temperature within the range of about 300° F. to about 550° F. under at least autogenous pressure for 1 second to 12 hours.

2. Kaolin clay having an average equivalent spherical diameter within the range of 0.5 to 0.8 microns, said kaolin clay consisting of substantially pure kaolinite and having reduced high shear viscosity as a result of having been obtained by pugging about 69 to 80 parts by weight of uncalcined kaolinite and about 31 to 20 parts by weight of water with a work input of at least 10 hp. hrs./ton of clay and then having been subjected to the action of hot water at a temperature within the range of about 300° F to about 550° F. under at least autogenous pressure for 1 second to 12 hours, the time being such that the viscosity of a 70% solids defluocculated slip of the kaolinite at a rate of shear of 4820 sec. —1 is substantially less than the viscosity at said rate of shear of a 70% solids deflocculated slip of the pugged kaolinite before said kaolinite was heated at said temperature and pressure.

3. A fluid clay slip suitable for use in the production of a paper coating composition and comprising water, a polyphosphate clay dispersant and at least 70% by weight of a treated kaolinite product having an average equivalent spherical diameter within the range of 0.5 to 0.8 micron and having reduced high shear viscosity as a result of having been obtained by pugging 69 to 80 parts by weight of uncalcined kaolinite with 31 to 20 parts by weight water with a work input of at least 10 hp. hrs./ton of clay and then having been subjected to the action of hot water at a temperature within the range of about 300° F. to about 550° F. under at least autogenous pressure for 1 second to 12 hours.

4. A process for treating kaolin clay to render said clay amenable to the formation of high clay solids slips having materially reduced viscosity at high shear rates which comprises pugging uncalcined kaolinite with water while employing a work input of at least 10 hp. hrs./ton of clay, and subjecting the pugged clay to the action of hot water at a temperature within the range of about 300° F. to about 550° F. under at least autogenous pressure for 1 second to 12 hours, the time being such that the viscosity of a 70% solids deflocculated slip of the kaolinite at a rate of shear of 4820 sec. —1 is substantially less than the viscosity at said rate of shear of a 70% solids deflocculated slip of the pugged kaolinite before said kaolinite was heated at said temperature and pressure.

5. A process for treating kaolin clay to render said clay amenable to the formation of high clay solids slips having materially reduced viscosity at high shear rates which comprises pugging uncalcined primary kaolinite with water, employing a work input of 30 to 75 hp. hrs./ton of said kaolinite and subjecting the pugged kaolinite to the action of hot water at a temperature within the range of about 300° F. to about 550° F. under at least autogenous pressure for 1 second to 12 hours, the time being such that the viscosity of a 70% solids deflocculated slip of the koalinite at a rate of shear of 4820 sec. —1 is substantially less than the viscosity at said rate of shear of a 70% solids deflocculated slip of the pugged kaolinite before said kaolinite was heated at said temperature and pressure.

6. A process for treating kaolin clay to render said clay amenable to the formation of high clay solids slips having materially reduced viscosity at high shear rates which comprises pugging 69 to 80 parts by weight of uncalcined kaolinite with 31 to 20 parts by weight water using a work input within the range of 10 to 175 hp. hrs./ton of kaolinite, said kaolinite having an average equivalent spherical diameter within the range of about 0.5 to 2 microns, diluting the pugged kaolinite with water to form an aqueous clay slip, and heating said aqueous slip at a temperature within the range of about 300° F. to about 550° F. under at least autogenous pressure for 1 second to 12 hours.

7. A process for treating kaolin clay to render said clay amenable to the formation of high clay solids slips having materially reduced viscosity at high shear rates which comprises pugging a mass of 69 to 80 parts by weight uncalcined kaolinite with 39 to 20 parts by weight water using a work input of 10 to 175 hp. hrs./ton of said kaolinite, said mass having a pH within the range of 3 to 7 and being free from clay dispersants, diluting at least a fraction of the pugged clay with water to form a clay slip, and heating said slip to a temperature within the range of about 300° F. to 550° F. under at least autogenous pressure for 1 second to 12 hours.

8. A process for treating kaolin clay to render said clay amenable to the formation of high clay solids slips having materially reduced viscosity at high shear rates which comprises forming a puggable mixture of 69 to 80 parts by weight uncalcined kaolinite and 31 to 20 parts by weight water, said mixture having a pH within the range of 3 to 7 and being free from clay dispersants, pugging said mixture with a work input of 10 to 175 hp. hrs./ton of dry kaolinite in said mixture, diluting the pugged clay with water to form a clay slip, and heating said slip at a temperature within the range of about 300° F. to about 550° F. for a time within the range of from about 1 second to 12 hours under at least autogenous pressure.

9. A process for treating kaolin clay to render said clay amenable to the formation of high clay solids slips having materially reduced viscosity at high shear rates which comprises forming a mixture of about 69 to 80 parts by weight of raw unfractionated kaolinite with 31 to 20 parts by weight of water, subjecting said mixture to mechanical work, applying thereto a work input of at least 10 hp. hrs./ton of said kaolinite, fractionating the kaolinite thus worked, diluting a fine size fraction of said kaolinite with water so as to form a slip containing about 35 to 50 parts by weight of kaolinite to 65 to 50 parts by weight of water, and heating said slip to a temperature within the range of about 300° F. to about 550° F. for a time within the range of 1 second to 12 hours under at least autogenous pressure.

10. A process for treating kaolin clay to render said clay amenable to the formation of high clay solids slips having materially reduced viscosity at high shear rates which comprises forming a puggable mixture of about 69 to 80 parts by weight of uncalcined kaolinite and about 31 to 20 parts by weight of water, said kaolinite having an average equivalent spherical diameter within the range of 0.5 to 0.8 micron, pugging said mixture with a work input of at least 10 hp. hrs./ton of said kaolinite in said mixture, said work input being sufficient to produce a zigzag pattern on a Hagan rheogram of a 70% solids deflocculated aqueous slip of the worked clay, diluting the kaolinite thus pugged with water to form a slip containing about 35 to 50 parts by weight of kaolinite to 65 to 50 parts by weight of water, and heating said slip at a temperature within the range of about 300° F. to about 550° F. for a time within the range of 1 second to 12 hours under at least autogenous pressure.

11. A process for treating kaolin clay to render said clay amenable to the formation of high clay solids slips having materially reduced viscosity at high shear rates which comprises forming a mixture of about 69 to 80 parts by weight of uncalcined kaolinite and about 31 to 20 parts by weight of water, said kaolinite being a fine size fraction of crude kaolinite and having an average equivalent spherical diameter within the range of 0.5 to 0.8 micron, pugging said mixture with a work input of at least 10 hp. hrs./ton of said kaolinite for a time such that a 70% solids deflocculated slip of the pugged kaolinite exhibits a viscoelastic effect as evidenced by the fact that a stress-rate of strain curve of said 70% solids deflocculated slip exhibits zigzag pattern substantially as shown in stress-rate of strain curve C of FIGURE 2, heating an aqueous slip of said pugged fine fraction of kaolinite at a temperature within the range of about 300° F. to about 550° F. under at least autogenous pressure for a time such that the viscosity of a 70% solids deflocculated slip of the kaolinite at a rate of shear of 4820 sec. —1 is substantially less than the viscosity at said rate of shear of a 70% solids deflocculated slip of the pugged kaolinite before said kaolinite was heated at said temperature and pressure.

12. A process for converting a high viscosity clay to a low viscosity clay which comprises forming a puggable mixture comprising 69 to 80 parts by weight uncalcined kaolinite and 31 to 20 parts by weight water, said kaolinite having an average equivalent spherical diameter within the range of about 0.5 to 2 microns and being further characterized by the fact that a 70% solids deflocculated aqueous slip of said kaolinite has an apparent viscosity in excess of 18.7 poises at a shear rate of 1530 sec. —1, pugging said mixture with a work input of at least 10 hp. hrs./ton of said kaolinite in said mixture, and heating the pugged kaolinite in the presence of hot water at a temperature within the range of about 440° F. to about 520° F. under at least autogenous pressure for a time within the range of about 1 second to 12 hours whereby a 70% solids deflocculated aqueous slip of the kaolinite thus treated has a viscosity appreciably below 18.7 poises at a shear rate of 4820 sec. —1.

13. The process of claim 12 wherein said pressure is autogenous.

14. The process of claim 12 wherein said pressure is sufficient to maintain substantially all of said water in liquid state.

15. A process for reducing the viscosity of sand ground kaolinite which comprises forming a puggable mixture comprising 69 to 80 parts by weight of uncalcined sand ground kaolinite and 31 to 20 parts by weight of water, pugging said mixture with a work input of at least 10 hp. hrs./ton of said kaolinite in said mixture, and heating the pugged kaolinite in the presence of liquid water, at a temperature within the range of about 300° F. to about 550° F. under at least autogenous pressure for a time within the range of about 1 second to 12 hours.

16. The process of claim 4 wherein said clay is primary English clay.

17. The process of claim 4 wherein said clay is sedimentary Georgia clay.

18. The process of claim 4 wherein said clay is a coarse size fraction of sedimentary Georgia kaolin clay crude and said clay is worked with a work input in excess of 100 hp. hrs./ton of said clay.

19. The process of claim 4 wherein said clay is a coarse size fraction of secondary Georgia kaolin crude and said clay is worked with a work input within the range of about 150 to 175 hp. hrs./ton of said clay.

20. The process of claim 15 wherein said pugged sand ground clay is hydraulically fractioned to recover a fine size fraction composed predominantly of particles finer than 2 microns and said fine size fraction is heated in the presence of said water at said pressure and said temperature.

References Cited by the Examiner

UNITED STATES PATENTS

| | | | |
|---|---|---|---|
| 2,500,972 | 3/1940 | Wilson | 106—148 |
| 2,710,244 | 6/1955 | Bertorelli | 23—110 |
| 2,742,345 | 4/1956 | Kloepfer et al. | 23—110 |
| 2,772,981 | 12/1956 | Smart | 106—72 |
| 2,907,666 | 10/1959 | Millman et al. | 106—72 |
| 2,995,458 | 8/1961 | Murray | 106—72 |
| 3,002,844 | 10/1961 | Reiling | 106—148 |

HELEN M. McCARTHY, *Acting Primary Examiner.*

ALEXANDER H. BRODMERKEL, TOBIAS E. LEVOW, *Examiners.*

D. J. ARNOLD, J. POER, *Assistant Examiners.*